(Model.)
M. M. McFALL.
Cotton Planter.
No. 239,820.                    Patented April 5, 1881.
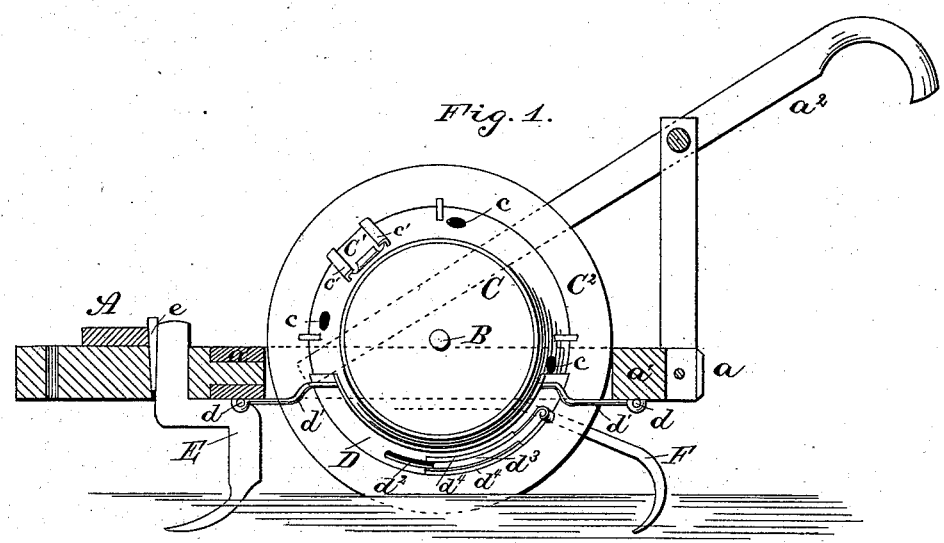
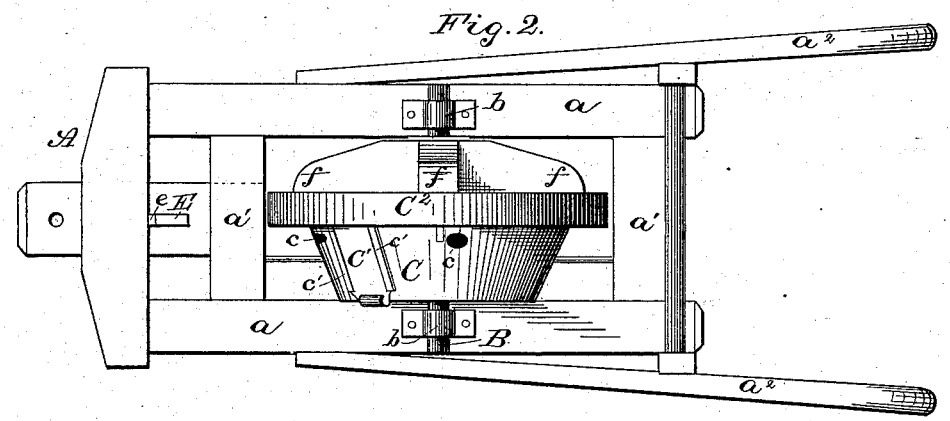
Witnesses:
J. W. Garner
D. O'Donnoghue
Inventor:
M. M. McFall.
By H. J. Ennis
Atty.

UNITED STATES PATENT OFFICE.

MARK M. McFALL, OF LEWISVILLE, TEXAS.

COTTON-PLANTER.

SPECIFICATION forming part of Letters Patent No. 239,820, dated April 5, 1881.

Application filed February 4, 1881. (Model.)

*To all whom it may concern:*

Be it known that I, M. M. McFALL, a citizen of the United States, residing at Lewisville, in the county of Denton and State of Texas, have invented certain new and useful Improvements in Cotton-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a cotton or other seed planter, and the novelty consists in the construction and arrangement of parts, as will be more fully hereinafter set forth, and specifically pointed out in the claim.

In the accompanying drawings, which form a part of this specification, Figure 1 is a side elevation, partly in section; and Fig. 2 is a top-plan view.

Referring to the drawings, A represents the frame, consisting of the longitudinal side bars, $a$, the cross-bars $a'$, and the handles $a^2$. Journaled at $b$ in the side bars, $a$, is the shaft B, which carries the hopper C, having feed-apertures $c$ and a slide-door, $C'$, working in guides $c'$, as shown; and $C^2$ represents the traversing wheel rigid upon said shaft.

Pivoted, by a crank-arm, $d$, of suspending links $d'$, to the cross-bars $a'$ is a segment, D, of sheet metal, which corresponds with the periphery of the revolving hopper C, and it is provided with an opening or aperture, $d^2$, governed by a slide-door, $d^3$, working in guides $d^4$, as shown.

E represents the opener, held in position by a wedge, $e$, in the frame A, so as to be readily removed or replaced at will, and F the coverers or cultivators.

I place importance upon the spring action of the crank-links $d$ $d'$ in their relation with the frame A and the feeding-segment, serving as they do in respect to the revolving hopper.

Radiating arms $f$ serve as markers, as is obvious.

From the foregoing description the operation of my invention is obvious.

I am aware that cotton-seed planters having rolling hoppers, and having shovel-plows for opening and closing the furrows are old, and such I do not desire to claim, broadly.

What I claim as new, and desire to secure by Letters Patent, is—

In a cotton-planter, the rectangular frame A, conical revolving hopper C C', having feed-aperture $c$, segmental-feeder D $d$, provided with the adjustable slide or door $d^2$ $d^3$, and guides $d^4$, in combination with the transporting-wheel $C^2$ and attached markers $f$, substantially as shown and described.

In testimony whereof I affix my signature in presence of two witnesses.

M. M. McFALL.

Witnesses:
EDWIN S. PHILLIPS,
ROBERT WILSON.